US005575879A

United States Patent [19]

Katz et al.

[11] Patent Number: 5,575,879

[45] Date of Patent: Nov. 19, 1996

[54] METHOD OF MAKING AN INSULATOR ELEMENT

[75] Inventors: Matthias Katz, Neckarsulm; Friedrich Beck, Öhringen-Verrenberg, both of Germany

[73] Assignee: Eagle-Picher Industries, GmbH, Verrenberger Weg, Germany

[21] Appl. No.: 322,056

[22] Filed: Oct. 12, 1994

[30] Foreign Application Priority Data

Oct. 12, 1993 [DE] Germany .......................... 43 34 780.0

[51] Int. Cl.[6] .................................................... B32B 31/00

[52] U.S. Cl. .......................... 156/250; 156/152; 156/248; 156/257; 156/268; 156/289; 428/40.1; 428/41.7; 428/41.8; 428/131; 428/137; 428/906

[58] Field of Search ............................... 428/40, 41, 906, 428/131, 137, 40.1, 41.7, 41.8; 156/248, 152, 257, 268, 250, 289

[56] References Cited

U.S. PATENT DOCUMENTS 2,608,503 8/1952 Meyer .................................... 156/152
3,488,248 1/1970 Long ...................................... 156/268
5,421,371 6/1995 Lauer ....................................... 428/40

FOREIGN PATENT DOCUMENTS 3022461 4/1988 Germany .
3736600 7/1991 Germany .

*Primary Examiner*—Nasser Ahmad
*Attorney, Agent, or Firm*—Bell, Seltzer, Park & Gibson, P.A.

[57] ABSTRACT

An insulator element (10), especially destined for noise insulation in vehicles, comprises an adhesive layer which is covered by a removable protective element (12). To facilitate removal of the protective element by peeling, the outer contour of the protective element (12) projects beyond the outer contour (11) of the insulator element (10). In forming a peeling tongue (13), first a protective element layer is removed from an adhesive layer of the starting material and swung into an upright position or bent back. During the subsequent cutting or punching process to produce the insulator element (10), the area of the protective element layer which was folded back is affected in part only, thus providing the peeling tongue (13). Thereafter the hinged peeling tongue (13) is bent so as to project beyond the outer contour (11) of the insulator element (10) thus offering a big enough gripping area to peel off the protective element (12).

4 Claims, 3 Drawing Sheets

METHOD OF MAKING AN INSULATOR ELEMENT

FIELD OF THE INVENTION

The instant invention relates to a method of making an insulator element, comprising at least one insulating layer provided with an adhesive layer which is covered by a removable protective element layer. The invention also relates to an insulator element produced by this method.

BACKGROUND OF THE INVENTION

Noise insulation elements are used particularly in the automobile sector. They are provided with an adhesive layer for mounting on the vehicle. The adhesive layer is provided with a protective element which can be peeled off and may be in the form of a protective paper or film. In practice, many problems arise the protective element is to be removed. That is due to the fact that the outer contours both of the insulator element and of the protective element are the same.

SUMMARY OF THE INVENTION

It is the object of the invention to suggest an insulator element and a method of producing an insulator element with which removal of the protective element is facilitated.

A method characterized by the features recited in claim 1 is suggested to solve the problem posed. With the method according to the invention, starting material is provided which consists of at least one insulating layer, at least one adhesive layer, and a protective element layer on top of the adhesive layer. The protective element layer is removed in certain areas by folding it away from the insulating layer and the adhesive layer. The desired shape of the insulator element is cut, the protective element layer which was turned up being affected in part only by the cutting and a hinged peeling tongue being formed. And this hinged peeling tongue is bent back on to the cut insulator element.

The resulting peeling tongue as obtained by the method according to the invention makes it easier to withdraw the protective element because the tongue projects beyond the outer contour of the insulator element. The peeling tongue also offers a big enough area to be grasped for removal of the protective element.

Advantageous modifications of the method according to the invention are specified in the dependent claims.

The protective element layer in certain areas preferably is turned into an upright position or doubled. As a result, the area of the protective element layer which defines the peeling tongue will not be affected when the insulator element is cut or punched out.

In further modification it is provided that the cutting edge of the insulator element extend at a small distance from a bending or folding edge of the protective element layer. It is absolutely no problem to proceed in this manner with present day cutting tools and their dimensional accuracy. Furthermore, a sufficiently great peeling tongue is obtained in this manner without much expenditure in terms of material.

The insulator element is preferred as a sheet or film for sound insulation. Such insulator elements are applied especially in the automobile sector.

BRIEF DESCRIPTION OF THE DRAWINGS

The invention will be described further, by way of example, with reference to the accompanying drawings, in which.

DESCRIPTION OF A PREFERRED EMBODIMENT

Figure 1:
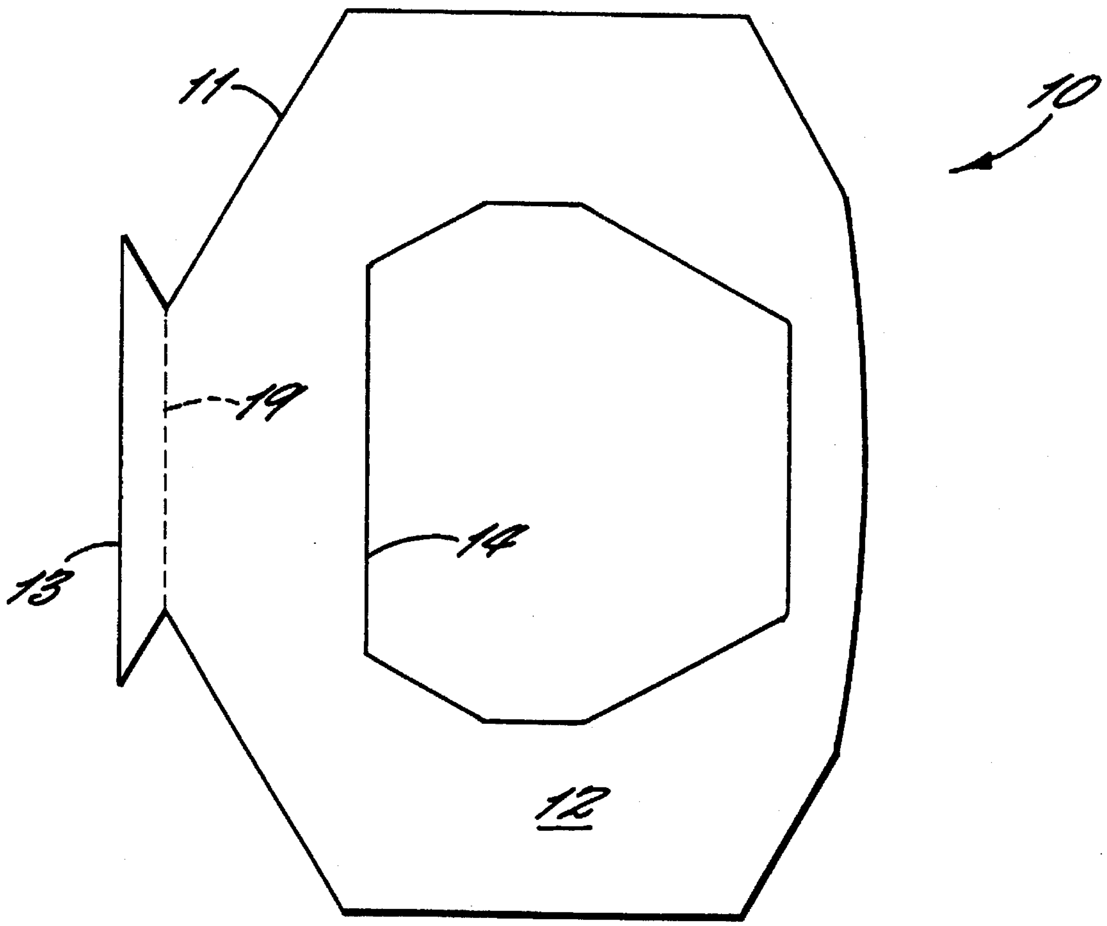
FIG. 1 is a top plan view of an insulator element, including a peeling tongue according to the invention.

In FIG. 1 an insulator element 10 for use as sound insulator in motor vehicles is shown in top plan view. The insulator element 10 has an outer contour 11 which is adapted to the specific case of application. The insulator element 10 also includes an aperture 14.

Figure 2:
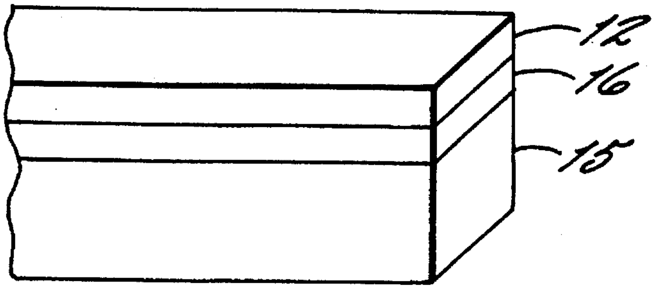
FIGS. 2 to 4 are diagrammatic illustrations to explain the method steps according to the invention.

The structure of the insulator element 10 may be gathered from FIG. 2. As shown, the insulator element 10 consists of an insulating layer 15, for example a sheet or film for sound insulation. An adhesive layer 16 is provided on the top surface of the insulating layer 15. A removable protective element layer 12 is applied on the adhesive layer 16.

In the illustration of FIG. 1 the peel-off protective element 12 still is present on the adhesive layer 16. Removal of the protective element 12 is facilitated by a peeling tongue 13 formed integral with the protective element. The peeling tongue 13 offers a big enough area to be grasped in order for the protective element 12 to be peeled with ease from the adhesive layer 16.

In making the insulator element 10, first a starting material is provided whose basic structure is shown in FIG. 2. The starting material comprises an insulating layer 15 on which an adhesive layer 16 is applied. The adhesive layer 16 is provided with a removable protective element layer 12.

Figure 3:
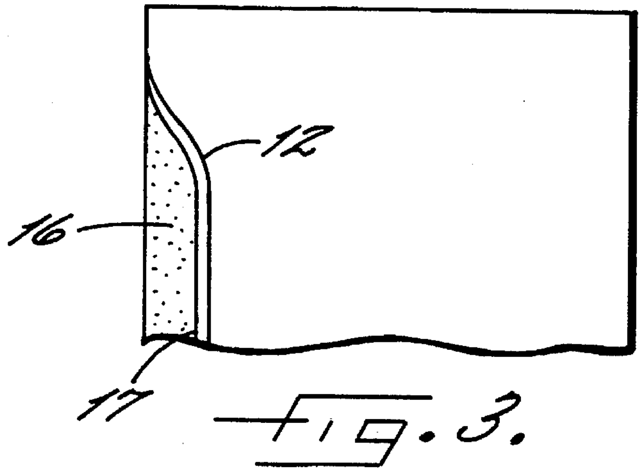
Figure 4:
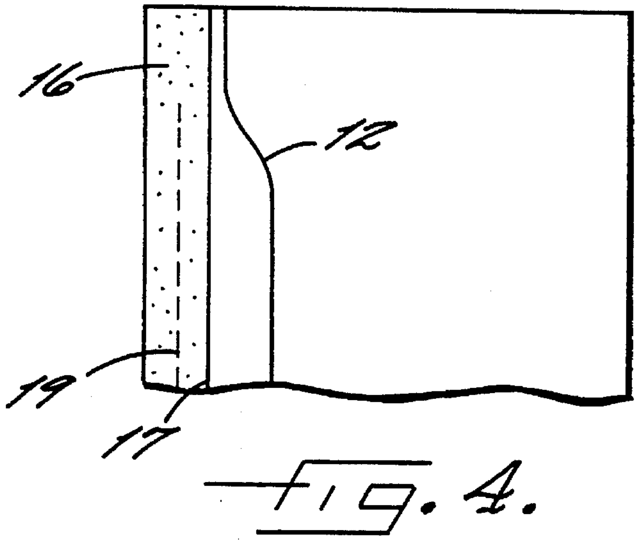

Prior to cutting or punching the insulator element 10 to the desired shape, the protective element layer 12 in certain areas is removed from the insulating layer 15 and the adhesive layer 16. As demonstrated in FIG. 3, this may be done by lifting certain areas of the protective element layer 12 into an upright position. In this manner certain areas of the protective element layer project in upward direction approximately vertically. Hereby a bending edge 17 is defined in the protective element layer 12.

Once the protective element layer 12 has been removed in certain areas from the adhesive layer 16, the cutting or punching takes place to produce the insulator element 10.

The cutting tool is guided in such a way as to affect the bent protective element layer 12 only partly.

Figure 5:
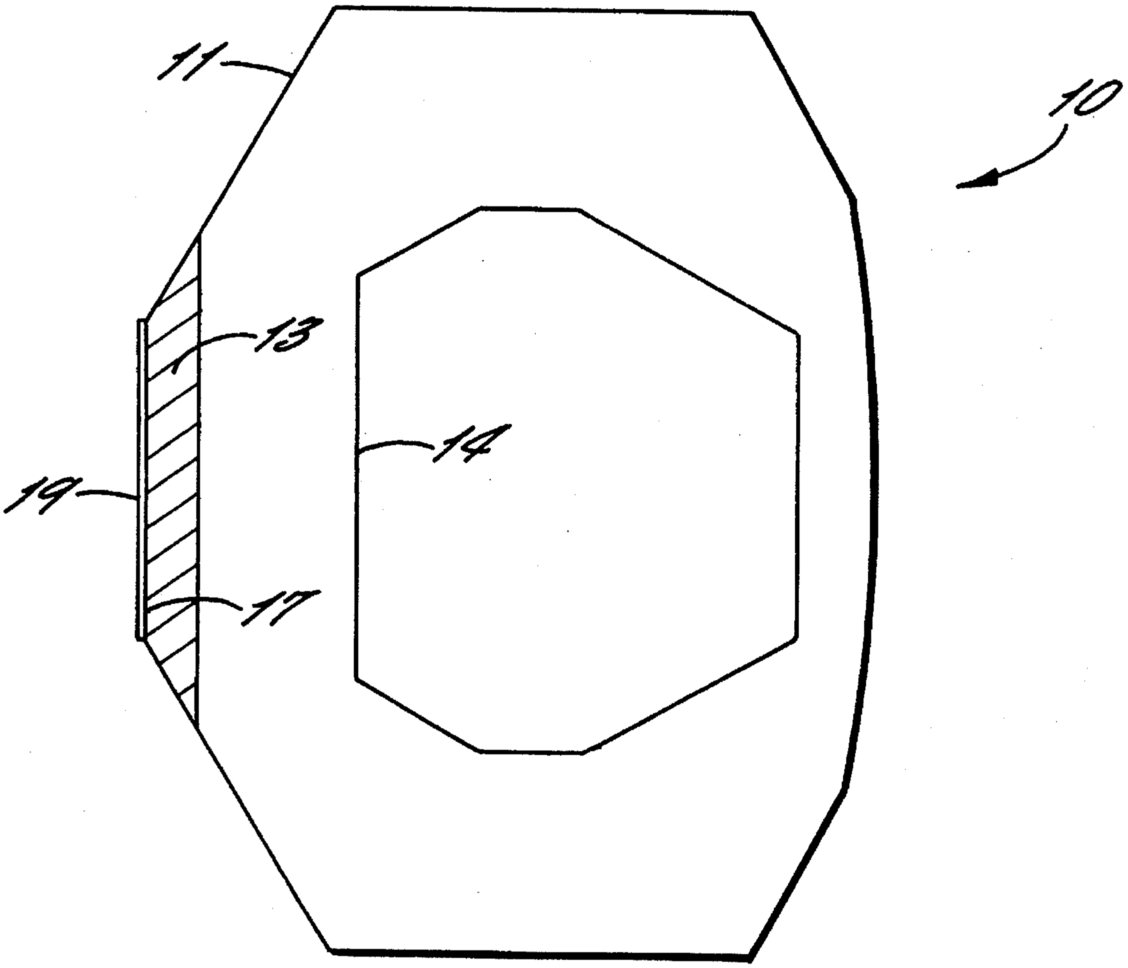
FIG. 5 is a top plan view of the insulator element shown in FIG. 1, with the peeling tongue still in folded condition.

As may be taken from FIG. 5, in making the insulator element 10 the cutting tool is aligned obliquely with respect to the bending edge 17 in the area of the peeling tongue 13 to be formed so that the protective element layer which was folded back is affected in part only. In the area of the peeling tongue 13, a cutting edge 19 is provided which is spaced a small distance from the folding edge 17 of the peeling tongue 13. In practice, the dimensional accuracy of the cutting tools is so great that this can be accomplished without difficulty.

After the cutting process, the peeling tongue 13 is moved from the doubled position into the position illustrated in FIG. 1. Consequently the peeling tongue 13 projects laterally beyond the cutting edge 19 and, therefore, offers a gripping area big enough for peeling off the protective element 12.

What is claimed is:

1. A method of making an insulator element comprising an adhesive layer having one and other opposite major surfaces at least one insulating layer adhering to one surface of said adhesive layer, the other surface of which is covered by a removable protective element layer, wherein starting material is provided consisting of at least one insulating layer, at least one adhesive layer, one surface of which adhering to the insulating layer, and a protective element layer covering to the other surface of the adhesive layer; the protective element layer is removed in certain areas by folding it away from the insulating layer and the adhesive layer; a desired shape of the insulator element is cut by at least reducing the extension of the insulating layer and of the adhesive layer in the areas of the folded-away protective element layer, the folded-away protective element layer being affected in part only by the cutting and forming a hinged peeling tongue; and the hinged peeling tongue is bent back to protrude from the insulating layer and the adhesive layer.

2. The method as claimed in claim 1, wherein the protective element layer (12) in certain areas is placed in an upright position or doubled.

3. The method as claimed in claim 1, wherein a cutting edge (19) of the insulator element (10) is arranged adjacent a bending edge (17) of the protective element layer (12).

4. The method as claimed in claim 1 wherein the insulator element (10) is a sheet or film for sound insulation.

* * * * *